United States Patent [19]
Ohtsuka et al.

[11] Patent Number: 5,748,858
[45] Date of Patent: *May 5, 1998

[54] METHOD OF AND SYSTEM FOR PREDICTING REPRODUCED COLOR IMAGE

[75] Inventors: Shuichi Ohtsuka; Akira Yoda; Yoshinori Usami, all of Kanagawa-ken, Japan

[73] Assignee: Fuji Photo Film Co., Ltd., Kanagawa, Japan

[*] Notice: The term of this patent shall not extend beyond the expiration date of Pat. No. 5,502,580.

[21] Appl. No.: 697,932

[22] Filed: Sep. 3, 1996

Related U.S. Application Data

[63] Continuation of Ser. No. 342,015, Nov. 16, 1994, abandoned.

[30] Foreign Application Priority Data

Nov. 17, 1993 [JP] Japan ................................ 5-288344
Jan. 27, 1994 [JP] Japan ................................ 6-007735

[51] Int. Cl.$^6$ ........................................................ G03F 3/10
[52] U.S. Cl. ........................... 395/109; 358/518; 358/527
[58] Field of Search .................................. 358/501, 518, 358/523, 524, 527; 395/109; G03F 3/16

[56] References Cited

U.S. PATENT DOCUMENTS

| | | | |
|---|---|---|---|
| 4,393,398 | 7/1983 | Horiguchi et al. | 358/527 |
| 4,500,919 | 2/1985 | Schrieber | 358/518 |
| 4,573,071 | 2/1986 | Sakamoto | 358/527 |
| 4,639,770 | 1/1987 | Jung et al. | 358/527 |
| 4,979,032 | 12/1990 | Alessi et al. | 358/527 |
| 5,257,097 | 10/1993 | Pineau et al. | 358/527 |
| 5,268,754 | 12/1993 | Van de Capelle et al. | 358/527 |
| 5,309,246 | 5/1994 | Barry et al. | 358/534 |
| 5,502,580 | 3/1996 | Yoda et al. | 358/518 |

FOREIGN PATENT DOCUMENTS

| | | |
|---|---|---|
| 0173032 | 3/1986 | European Pat. Off. . |
| 0243974 | 11/1987 | European Pat. Off. . |
| 2512974 | 9/1982 | France . |
| 2077548 | 12/1981 | United Kingdom . |
| WO9007837 | 7/1990 | WIPO . |

*Primary Examiner*—Thomas L. Stoll
*Attorney, Agent, or Firm*—Sughrue, Mion, Zinn, Macpeak & Seas, PLLC

[57] ABSTRACT

YMCK halftone dot percentage data from an image editor are converted into color image data in an XYZ colorimetric system with a common color space conversion table generated by a common color space conversion table generator. The color image data are converted into a gamut mapping and appearance corresponding to an image monitor device with a gamut mapping/appearance table generated by a gamut mapping/appearance generator. Then, the color image data are converted into color image data in a device color space of an image output unit with a device color space conversion table generated by a device color space conversion table generator for thereby predicting a color image which will be reproduced by the image output unit. Alternatively, the YMCK halftone dot percentage data from the image editor may be corrected using dot gain correcting coefficients established respectively for tristimulus values X, Y, Z, and then converted into color image data in the XYZ color space with a common color space conversion table.

25 Claims, 6 Drawing Sheets

METHOD OF AND SYSTEM FOR PREDICTING REPRODUCED COLOR IMAGE

This is a continuation of application Ser. No. 08/342,015, filed Nov. 16, 1994.

BACKGROUND OF THE INVENTION

1. Field of the Invention

The present invention relates to a method of and a system for predicting a reproduced color image by establishing a color space data conversion formula including printing conditions such as print paper, ink, etc. used as parameters; converting color image data into color space data for an image monitor device according to the established color space data conversion formula; and outputting the color space data to make it possible to predict colors easily and highly accurately.

2. Description of the Related Art

In recent years, there have widely been used color printing systems for reading a color image from an original document such as a photograph, a painting, or the like or for processing color image data supplied from an image input device and either outputting a color image as a hard copy from a printer, or printing a color image with a press plate. It is desirable to be able to display a color image of reproduced color tones on a cathode-ray tube (CRT) or the like irrespective of different output mediums and processing steps.

A printed material is produced according to a number of processing steps. More specifically, color separation films of Y, M, C, K are generated on the basis of color image data supplied from an image input device, and presensitized plates are exposed to color images through the color separation films. Then, the color images on the presensitized plates are developed, and the presensitized plates are set on a printing press to produce a printed material. The colors on the printed material which are finally produced depend on various printing conditions including the paper, inks, and water used, the type of the printing press, and the screen ruling and dot shape which are employed for the formation of dot-matrix images.

In the field of printing industry which requires the above complex processing steps and conditions, there has been a demand for a predicting system which displays color image data processed as desired on a CRT, a color printer, or the like for the operator to confirm the final image quality of a printing material displayed on the CRT or the like with high accuracy.

One prior art system which meets the above demand is a system disclosed in U.S. Pat. No. 4,500,919. The disclosed system comprises means for determining tristimulus appearance signals, which are of a common color data format, from an original colored document, means for effecting aesthetic correction on the tristimulus appearance signals, means for displaying a corrected color image based on the corrected tristimulus appearance signals, and means for selecting color materials for a hard copy to obtain reproduction signals which colorimetrically match the displayed color image. A combination of color materials, or colorants selected by the color material selecting means is printed, and the printed color materials are measured by a colorimeter. The reproduction signals are then corrected based on the measured data to achieve a match between the printed color image and the displayed color image.

The above conventional system is, however, not suitable for use in applications where complex conditions are involved, such as in a process of producing a printed material. For producing a printed material, it is necessary to establish not only color materials, but also output conditions including the type of the support layer of a printed material, the number of colors to be printed, a K (black) printer quantity, and a screen ruling, and also printing press conditions including a printing order, a printing pressure, color material quantities, and a printing speed. It is not practical to effect measuring and correcting processes with respect to all these conditions for reproducing a color image highly accurately.

Color ranges that can be reproduced by printing processes are narrow, and differ from printing conditions to printing conditions. Since the conversion from color image data to YMCK halftone dot percentage data depends on the operator and the equipment used for the conversion, it is highly difficult to make a common color data format, e.g., tristimulus values of an XYZ colorimetric system, correspond uniquely to YMCK halftone dot percentage data for printing.

To produce a printed material, it is necessary to take a dot gain into account if a continuous-gradation image is to be formed on a support by area modulation techniques. Examples of area modulation techniques for producing area modulation data are described in U.S. Pat Nos. 4,926,248 and 5,099,259. The light reflected from an area-modulated image formed on a support varies depending on the material of the support and the characteristics of inks that are used to form the image. It is also known the reflected light varies depending on the screen ruling and dot shape of the area-modulated image.

The applicant has found out that the dot gain varies depending on the wavelength of illuminating light which is used to determine and specify the colors of a print. Specifically, prints that are printed with the same color materials exhibit a different dot gain depending on the color representing coordinates, or color space coordinates. Examples of color representing coordinates, or color space coordinates, include L*a*b, RGB and CIE-XYZ used. The dot gain also depends on the ratio of an area of one color which is printed on a background of another color. For example, the dot gain of a cyan ink printed over a magenta ink is usually of a value smaller than the dot gain of a cyan ink printed over a white background. In other words, the applicant has found that the area ratio of one color with respect to background of another color affects the dot gain.

SUMMARY OF THE INVENTION

It is therefore a first object of the present invention to provide a method of and a system for predicting a reproduced color image by displaying a color image corresponding to a color print easily and highly accurately on an image monitor device such as a CRT or the like, while taking printing conditions into account.

A second object of the present invention is to provide a method of and a system for predicting a reproduced color image while taking effects of a dot gain into account.

To achieve the first object, there is provided in accordance with the present invention a system for predicting a reproduced color image in producing a color printed material through a platemaking and printing process from processed input color image data and outputting a color image corresponding to the color printed material, comprising printing condition profiles which represent printing conditions of the color printed material established as parameters, data conversion profiles which represent color space data conversion formulas established for converting the processed input color image data into data in a color space of an image monitor device using the parameters represented by the printing condition profiles, and converting means for converting the processed input color image data into the data in the color space of the image monitor device according to the color space data conversion formulas, the arrangement being such that a color image corresponding to the color printed material can be displayed from the data in the color space.

In the above system for predicting a reproduced color image, color image data are converted into data in a color space of the image monitor device with color space data conversion formulas established with respect to the printing conditions, and then reproduced and outputted. By establishing various printing conditions as parameters in the printing condition profiles, selecting desired parameters from the printing condition profiles so as to correspond to the color space data conversion formulas, and effecting data conversion according to the color space data conversion formulas, it is possible to obtain a monitor image corresponding to the printing conditions.

To achieve the second object, there is provided in accordance with the present invention a method of predicting a reproduced color image by generating area modulation data for respective color materials, colorants from processed input color image data and producing a color printed material based on the area modulation data, comprising the steps of correcting the area modulation data based on dot gain correcting coefficients established for respective color representing coordinates of an image, the correction being based on an output medium on which the color printed material is to be produced, generating color image data of the color representing coordinates from the corrected area modulation data, and displaying a color image corresponding to the color printed material based on the color image data of the color representing coordinates.

According to the present invention, there is also provided a system for predicting a reproduced color image by generating area modulation data of respective color materials from processed input color image data, producing a color printed material based on the area modulation data, and displaying a color image corresponding to the color printed material, comprising printing condition profiles which represent printing conditions established as parameters, the printing conditions including dot gain correcting coefficients established for respective color representing coordinates of an image, the correction based on an output medium on which the color printed material is to be produced, corrective formula profiles which represent corrective formulas established for correcting the area modulation data based on the dot gain correcting coefficients, and conversion formula profiles which represent conversion formulas established for converting the corrected area modulation data into color image data corresponding to the respective color representing coordinates, the arrangement being such that color image data suitable for an image monitor device can be produced from the color image data corresponding to the respective color representing coordinates.

In the above method and system for predicting a reproduced color image, area modulation data are corrected using dot gain correcting coefficients established for respective color representing coordinates of an image according to printing conditions, color image data corresponding to the color representing coordinates are converted from the corrected area modulation data, and a monitor image is produced from the converted color image data. In other words, the correction of area modulation data is also provided based on output conditions other that the output medium on which the printed color material is to be produced. These conditions include the screen ink type, support layer and other criteria. In this manner, an image to be printed can be predicted accurately.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
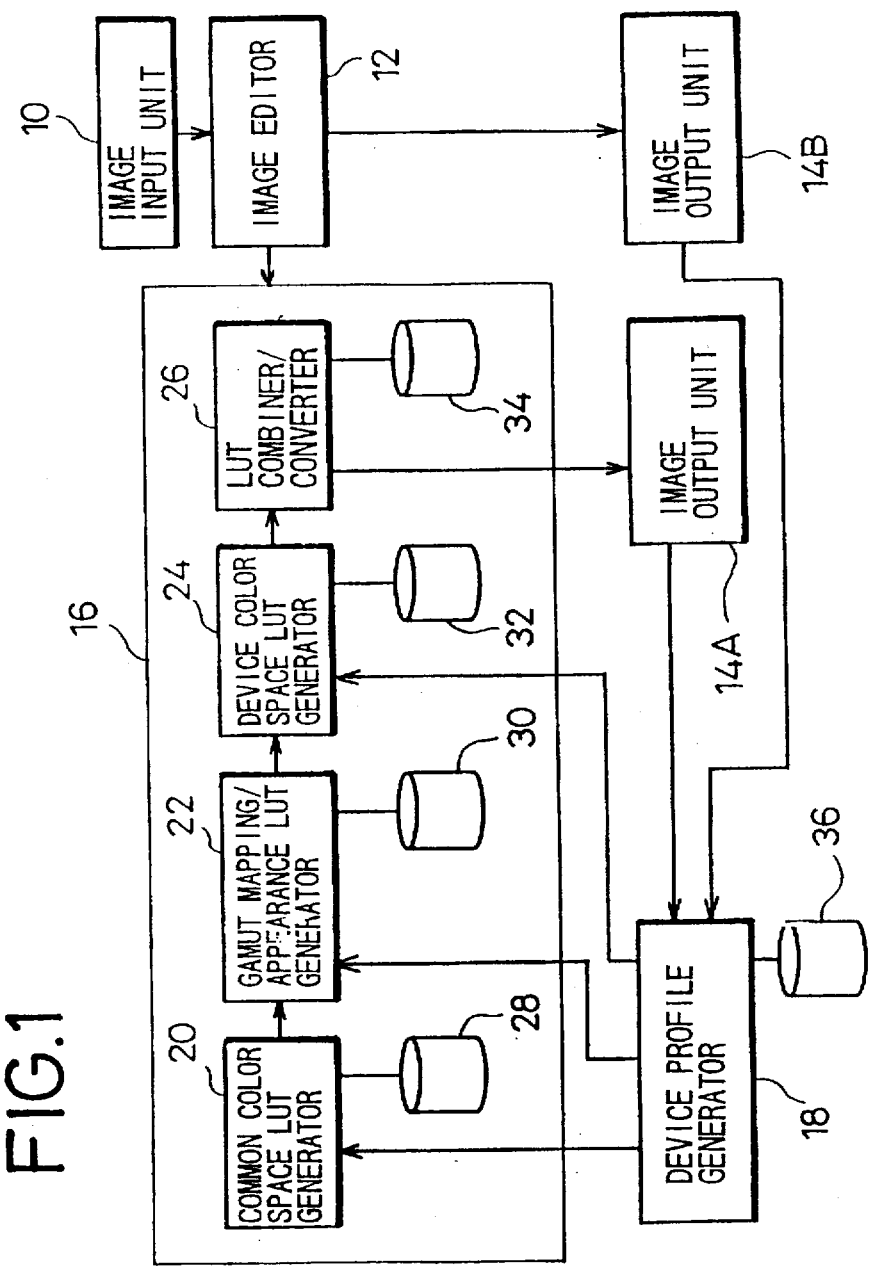
FIG. 1 is a block diagram of a system for predicting a reproduced color image according to the present invention.

As shown in FIG. 1, a system for predicting a reproduced color image according to the present invention generally comprises an image input unit 10 for reading color image data from a color original document or an external device, an image editor 12 for effecting image processing including an aesthetic process on the color image data thus read, an image output unit (image monitor device) 14A for displaying or outputting the processed color image data on a CRT, a color printer, or the like for predicting colors, an image output unit 14B for outputting the processed color image as a color printed material, an image processor 16 for converting the color image data into color image data that can be handled by the image output unit 14A, and a device profile generator 18 for generating a device profile group of device profiles which represent characteristics of the image output units 14A, 14B, and characteristics of a color reproduction process and color reproduction mediums including color materials, a support layer, phosphors, etc.

The image input unit 10 has three or more sensors having different spectral sensitivities for reading the image densities of pixels of a color original document. For example, the image input unit 10 may comprise a drum-type scanner for reading the image densities of pixels of a color original document mounted on a drum in synchronism with rotation of the drum, or a flatbed scanner for reading the image densities of pixels of a color original document with either a line sensor composed of a single array or a plurality of arrays of photoelectric transducers or a two-dimensional sensor composed of a two-dimensional matrix of photoelectric transducers.

The image editor 12 effects image processing including an aesthetic process on the color image data from the image input unit 10 to generate YMCK halftone dot percentage data supplied to the image output unit 14B.

The image output unit 14B produces Y, M, C, K color separation films for generating presensitized plates to produce a printed material, based on the YMCK halftone dot percentage data supplied as color image data from the image editor 12, then generates presensitized plates from the Y, M, C, K color separation films, and produces a printed material from the presensitized plates. The image output unit 14A may comprise a CRT, a color printer, or the like for displaying or outputting a color image having the same color representation and image quality as the printed material generated by the image output unit 14B.

The image processor 16 comprises a common color space LUT generator 20 for generating a conversion table (hereinafter referred to as an "LUT") for converting the YMCK halftone dot percentage data supplied as color image data from the image editor 12 into color image data in a common color space, a gamut mapping (reproducible color range)/appearance LUT generator 22 for generating an LUT for compressing or converting a gamut mapping of the image input unit 10 in the common color space into a gamut mapping in the image output unit 14A, and making appearance adjustments depending on the difference between observing conditions, a device color space (specific color space) LUT generator 24 for generating an LUT for converting the color image data in the common color space into color image data in the device color space of the image output unit 14A, and an LUT combiner/converter 26 for generating a combined LUT composed of all or some of the LUTs generated by the common color space LUT generator 20, the gamut mapping/appearance LUT generator 22, and the device color space LUT generator 24.

The common color space conversion table generated by the common color space LUT generator 20, the gamut mapping/appearance LUT generated by the gamut mapping/appearance LUT generator 22, the device color space LUT generated by the device color space LUT generator 24, and the combined LUT generated by the LUT combiner/converter 26 are stored respectively in data files 28, 30, 32, 34. The LUT combiner/converter 26 combines LUTs generated by the LUT generators 20, 22, 24, and converts color image data read by the image input unit 10 into color image data using the combined LUT and outputs the color image data to the image output unit 14A.

The common color space is a color space composed of data not depending on the input and output units and the output medium, such as a CIE-XYZ colorimetric system, an L*a*b* colorimetric system, an YCC colorimetric system which can uniquely be converted mathematically to and from the CIE-XYZ colorimetric system or the L*a*b* colorimetric system, an YIQ colorimetric system, or an RGB colorimetric system representing the phosphors of a display monitor such as a CRT or the like. It is therefore possible to carry out desired image processing in the common color space without concern over the input and output units and the output medium. The device color space is a color space composed of particular data handled by the image input unit 10 and the image output units 14A, 14B.

The device profile generator 18 has measuring units for measuring various physical characteristics as desired, establishes color space data conversion formulas, relationship formulas and parameters used in the data processing in the image processor 16 as a device profile group, and stores the device profile group in a data file 36.

Figure 2:
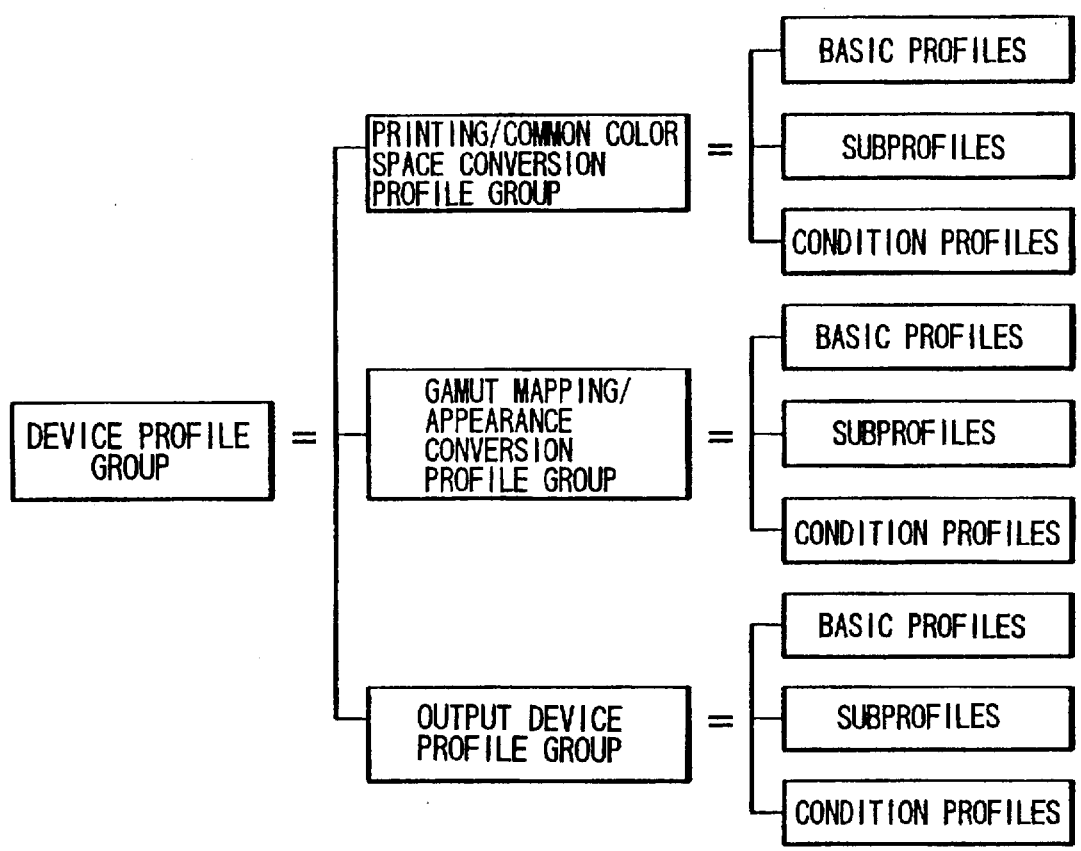
FIG. 2 is a diagram of a device profile group in the system for predicting a reproduced color image according to the present invention.

The device profile group is a collection of profiles representing, in a common data format, color reproduction processes in the image output devices 14A, 14B, environmental conditions in which they are used, physical factors and characteristics of materials of a color original document and a recording medium, and formulas which couple these data. Basically, as shown in FIG. 2, the device profile group includes a printing/common color space conversion profile group for generating a common color space conversion table for converting YMCK halftone dot percentage data supplied from the image editor 12 into color image data in a common color space such as of a CIE-XYZ colorimetric system, an RGB colorimetric system, an L*a*b* colorimetric system, or the like while taking various printing conditions into account, a gamut mapping/appearance conversion profile group for generating a gamut mapping/appearance conversion table for converting the gamut mapping and appearance of the color image data in the common color space into a desired gamut mapping and appearance while taking into account the gamut mapping and appearance in the image output unit 14A, and an output device profile group for converting the color image data in the common color space into color image data in the device color space in the image output unit 14A. Each of the above profile groups includes basic profiles, subprofiles, and condition profiles.

Figure 3:
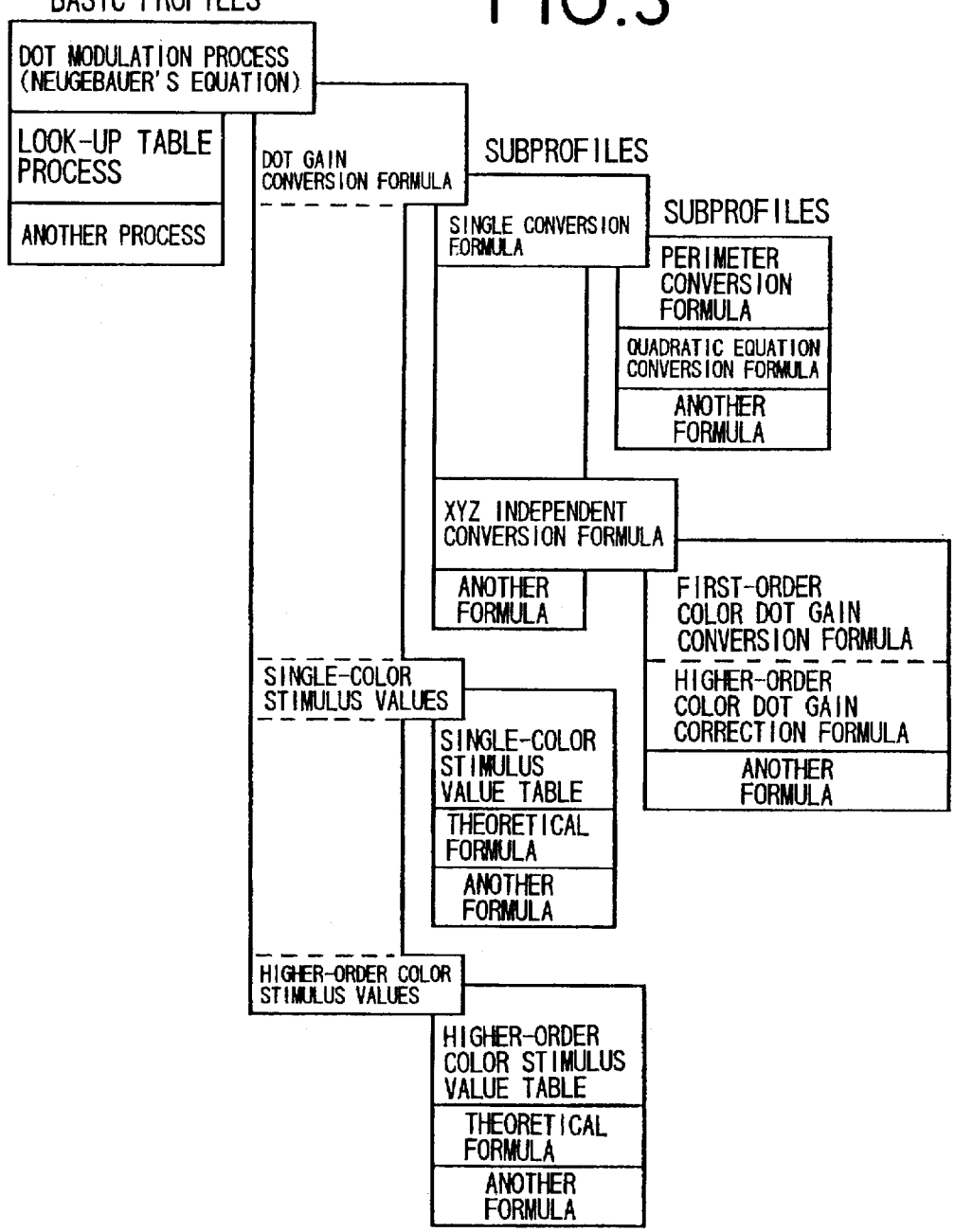
FIG. 3 is a diagram showing a hierarchical structure of basic profiles and subprofiles of an output device profile group shown in FIG. 2.

FIG. 3 shows, by way of example, the basic profiles (conversion formula profiles) and subprofiles (corrective formula profiles) of the printing/common color space conversion profile group which is defined in relation to the color reproduction process in the image output device 14B.

The basic profiles represent (1) a dot modulation process using the Neugebauer's equation, (2) a conversion process using a look-up table, and (3) another process, respectively, which can be selected one at a time. One of these basic profiles is selected depending on the color reproduction process in the image output device 14B, and established as a color space data conversion formula for conversion between the common color space and the device color space of the image output device 14B.

The Neugebauer's equation is a color-predicting basic function which defines the relationship between the XYZ and YMCK colorimetric systems in the CIE common color space, and is defined according to the equation (1) below.

$$\begin{aligned}
X = & X_c \cdot c_x \cdot (1 - m_x) \cdot (1 - y_x) \cdot (1 - k_x) \\
& + X_m \cdot m_x \cdot (1 - c_x) \cdot (1 - y_x) \cdot (1 - k_x) \\
& + X_y \cdot y_x \cdot (1 - c_x) \cdot (1 - m_x) \cdot (1 - k_x) \\
& + X_k \cdot k_x \cdot (1 - c_x) \cdot (1 - m_x) \cdot (1 - y_x) \\
& + X_w \cdot (1 - k_x) \cdot (1 - c_x) \cdot (1 - m_x) \cdot (1 - y_x)
\end{aligned} \right\} \text{first-order color term} \quad (1)$$

$$\left.\begin{aligned}
& + X_{cm} \cdot c_{xm} \cdot m_{xc} \cdot (1 - y_x) \cdot (1 - k_x) \\
& + X_{cy} \cdot c_{xy} \cdot y_{xc} \cdot (1 - m_x) \cdot (1 - k_x) \\
& + X_{ck} \cdot c_{xk} \cdot k_{xc} \cdot (1 - m_x) \cdot (1 - y_x) \\
& + X_{my} \cdot m_{xy} \cdot y_{xm} \cdot (1 - c_x) \cdot (1 - k_x) \\
& + X_{mk} \cdot m_{xk} \cdot k_{xm} \cdot (1 - c_x) \cdot (1 - y_x) \\
& + X_{yk} \cdot (1 - c_x) \cdot (1 - m_x) \cdot y_{xk} \cdot k_{xy}
\end{aligned}\right\} \text{second-order color term}$$

$$\left.\begin{aligned}
& + X_{cmy} \cdot c_{xmy} \cdot m_{xcy} \cdot y_{xcm} \cdot (1 - k_x) \\
& + X_{cmk} \cdot c_{xmk} \cdot m_{xck} \cdot k_{xcm} \cdot (1 - y_x) \\
& + X_{myk} \cdot m_{xyk} \cdot y_{xmk} \cdot k_{xmy} \cdot (1 - c_x) \\
& + X_{cyk} \cdot c_{xyk} \cdot y_{xck} \cdot k_{xcy} \cdot (1 - m_x)
\end{aligned}\right\} \text{third-order color term}$$

$$+ X_{cmyk} \cdot c_{xmyk} \cdot m_{xcyk} \cdot y_{xcmk} \cdot k_{xcmy} \text{ fourth-order color term}$$

$$Y = Y_C \cdot c_Y \cdot (1 - m_Y) \cdot (1 - y_Y) \cdot (1 - k_Y) + \ldots$$

-continued $$Z = Z_c \cdot c_z \cdot (1 - m_z) \cdot (1 - y_z) \cdot (1 - k_z) + \ldots$$

where X, Y, Z represent tristimulus values in the XYZ colorimetric system, $X_c$, $X_m$, $X_y$, $X_k$, etc. represent XYZ stimulus values (single-color stimulus values) with respect to single-color inks of Y, M, C, and K, $X_w$, etc. represent tristimulus values of the support layer of the printed material, $X_{cm}$, $X_{cmy}$, $X_{cmyk}$, etc. represent XYZ stimulus values (higher-order color stimulus values) of an area where inks are superimposed, e.g., $X_{cm}$ represents XYZ stimulus values of an area where inks of C and M are superimposed, $c_x$, $m_x$, $y_x$, $k_x$, etc. represent dot % values of inks of C, M, Y, K at the time they are observed with color light corresponding to color matching functions $x(\lambda)$, and $c_{Xm}$, $c_{Xmy}$, $c_{Xmyk}$, etc. represent dot % values of an ink of C at the time it is observed with color light corresponding to the color matching functions $x(\lambda)$, e.g., $c_{Xmy}$ represents a dot % value for making a correction with respect to the presence of the inks of M and Y (higher-order color dot gain correction). Since the XYZ colorimetric system has a one-to-one correspondence to the L*a*b* colorimetric system or the RGB colorimetric system, the Neugebauer's equation can also be defined as an equation indicative of the relationship between the L*a*b* colorimetric system and the YMCK colorimetric system.

Depending on the selected basic profile, there is established a subprofile in which set values can be selected according to predetermined relationship equations or output conditions. For example, if (1) the dot modulation process using the Neugebauer's equation is selected as the basic profile, then its variables are classified into (11) a dot gain conversion formula ($c_x$, $m_x$, $c_{Xm}$, $c_{Xmy}$, etc.), (12) single-color stimulus values ($X_c$, $X_m$, $X_y$, $X_k$, etc.), and (13) higher-order color stimulus values ($X_{cm}$, $X_{cmy}$, $X_{cmyk}$, etc.), and subprofiles are established for each of these sets of values. For the dot gain conversion formula, it is possible to select a desired subprofile from (21) a single conversion formula, (22) an XYZ independent conversion formula, and (23) another formula. For the single-color stimulus values, it is possible to select a desired subprofile from (31) a single-color stimulus value table, (32) a theoretical formula, and (33) another formula. For the higher-order color stimulus values, it is possible to select a desired subprofile from (41) a higher-order color stimulus value table, (42) a theoretical formula, and (43) another formula. The single conversion formula represents a process for representing and processing $c_X$, $c_Y$, $c_Z$, etc. with one value $c_n$ independent of X, Y, Z in the equation (1) above, and the XYZ independent conversion formula represents a process for establishing and processing $c_X$, $c_Y$, $c_Z$, etc. independently for each of X, Y, Z.

Depending on each of the above subprofiles, there is established a subprofile in which another relationship equation can be established. For example, with respect to the subprofile of the single conversion formula, a desired subprofile can be selected from (51) a perimeter conversion formula, (52) a quadratic equation conversion formula, and (53) another formula. With respect to the subprofile of the XYZ independent conversion formula, a desired subprofile can be selected from (61) a first-order color dot gain conversion formula, (62) a higher-order color dot gain conversion formula, and (63) another formula.

The perimeter conversion formula which can be selected with respect to the subprofile of the single conversion formula is a formula for calculating dot % values $c_X$, $c_Y$, $c_Z$, etc. (=$c_n$, etc.) in the case where the dot gain is considered to be proportional to the perimeter of formed dots and produce a quasi-absorption range in a certain region outside of a region where ink is attached. The perimeter conversion formula is defined by:

$$c_n = c + \alpha_p \cdot \alpha_m \cdot L \cdot \sqrt{c} \ /1500 \ (0 \leq c < 50) \quad (2)$$
$$= c + \alpha_p \cdot \alpha_m \cdot L \cdot \sqrt{100 - c} \ /1500 \ (50 \leq c < 100)$$

where $\alpha_p$, $\alpha_m$ are gain coefficients, and L the screen ruling. The gain coefficient $\alpha_p$ is a parameter depending on the paper on which the color image is to be printed, and the gain coefficient $\alpha_m$ is a parameter depending on the printing press and the ink.

The quadratic equation conversion formula is a quadratic equation that approximates features by which the dot gain is of a maximum value if the dot % is about 50% and 0 if the dot % is 0 and 100%, and calculates the dot % values $c_n$ on the printed material in view of the exposure, development, printing, and optical dispersion effect of the presensitized plates, as follows:

$$c_n = c + g - g/250 \cdot (c - 50)^2 \quad (3),$$

and $$g = g_1 + g_2 + g_3 + g_4 + g_5 \quad (4)$$

where $g_1$ is a gain coefficient as a dot gain correcting coefficient which is a parameter depending on the printing press, $g_2$ is a gain coefficient which is a parameter depending on the ink, $g_3$ is a gain coefficient which is a parameter depending on the paper of the support layer of the printed material, $g_4$ is a gain coefficient which is a parameter depending on the screen ruling, and $g_5$ is a gain coefficient which is a parameter depending on the dot shape.

The first-order dot gain conversion formula which can be selected with respect to the XYZ independent conversion formula sets the gain coefficient $\alpha_p$ in the equation (2) to $\alpha_{pX}$, $\alpha_{pY}$, $\alpha_{pZ}$ independently for the respective stimulus values of X, Y, Z and also sets the dot % value $c_X$, for example, as:

$$c_x = c + \alpha_{pX} \cdot \alpha_m \cdot L \cdot \sqrt{c} \ /1500 \ (0 \leq c < 50) \quad (5)$$
$$= c + \alpha_{pX} \cdot \alpha_m \cdot L \cdot \sqrt{100 - c} \ /1500 \ (50 \leq c < 100)$$

with respect to the perimeter conversion formula, and sets the dot % value $c_X$ as:

$$c_X = c + g - g/250 \cdot (c - 50)^2 \quad (6)$$

based on the equation (3) with respect to the quadratic equation conversion formula. The applicant has found out that the dot gain of the printed material differs depending on the wavelength of the illuminating light used when it is measured, and hence differs with respect to each of the tristimulus values X, Y, Z.

The higher-order color dot gain conversion formula sets the dot % value $c_{Xy}$, for example, as:

$$c_{Xy} = c_X - a_{cXy} \cdot y_X^2 + b_{cXy} \cdot y_X \quad (7)$$

where $a_{cXy}$, $b_{cXy}$ are higher-order color dot gain correction parameters, with respect to the dot % values of the second- and higher-order color term in the equation (1). It has experimentally been confirmed that the dot gain of ink of C in the presence of ink of Y and the dot gain of ink of C on ink-free paper are different from each other. This is because if the ink exists, then it varies the dispersion characteristics of light or it causes auxiliary absorption. Usually, as the dot % of other ink increases, the dot gain decreases. The decrease is approximated by a quadratic equation.

Figure 4:
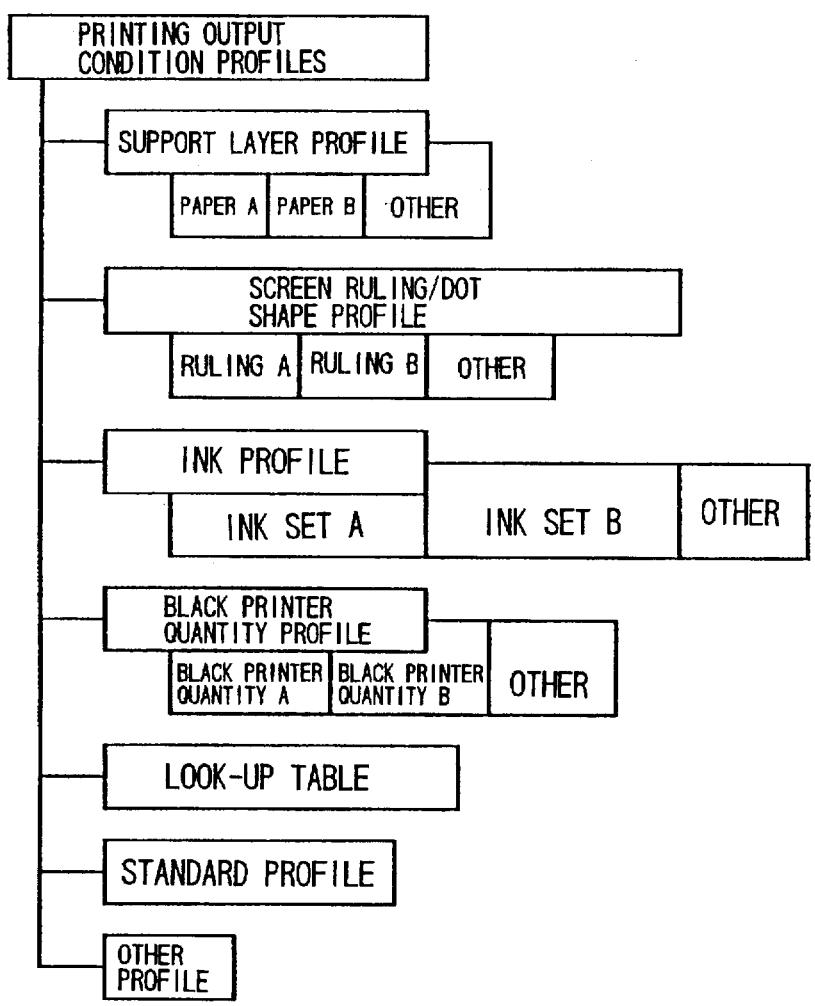
FIG. 4 is a diagram showing condition profiles of a print/common color space conversion profile group shown in FIG. 2.

FIG. 4 shows printing output condition profiles of the printing/common color space conversion profile group shown in FIG. 2. The printing output condition profiles represent output conditions used for generating a printed material. The printing output condition profiles are composed of a support layer profile for defining parameters ($\alpha_p$, $\alpha_{px}$, $\alpha_{py}$, $\alpha_{pz}$, $g_3$, $a_{cxy}$, $b_{cxy}$, etc.) relative to the paper of the support layer of the printed material, a screen ruling/dot shape profile for defining parameters (L, $g_4$, etc.) relative to the screen ruling and the dot shape, an ink profile for defining parameters ($g_2$, $\alpha_m$, a single-color stimulus value table, a higher-order color stimulus value table, theoretical formula parameters, etc.) relative to the characteristics of inks used in the printing, a black printer quantity profile for defining parameters (p, k, etc.) relative to a black printer quantity (described later on), a look-up table to be referred to when the look-up table formula is selected from the basic profiles shown in FIG. 3, a standard profile for defining average parameters with respect to parameters not defined in the above profiles, and other profiles (including those relative to the printing press).

Figure 5:
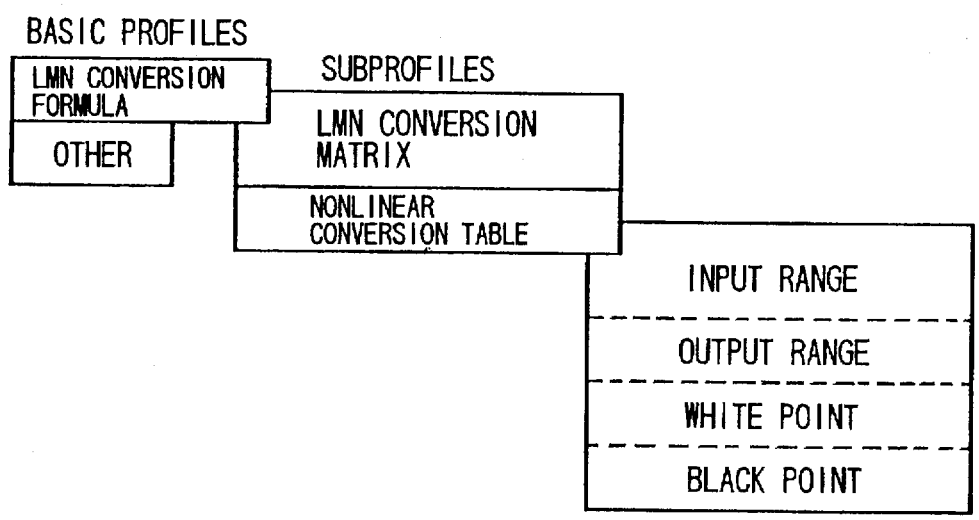
FIG. 5 is a diagram showing a hierarchical structure of basic profiles and subprofiles of a gamut mapping/appearance conversion profile group shown in FIG. 2.

Similarly, as shown in FIG. 5, the gamut mapping/ appearance conversion profile group is composed of basic profiles representing (71) an LMN conversion process based on a combination of nonlinear conversion and 3×3 matrix conversion and (72) another process, one of which can be selected at a time, and subprofiles representing (81) an LMN conversion matrix, (82) a nonlinear conversion table, and (83) another table, one of which can be selected at a time with respect to the LMN conversion process. Variables relative to (91) an input range, (92) an output range, (93) a white point, and (94) a black point are established with respect to the nonlinear conversion table, using the parameters of the condition profiles of the printing/common color space conversion profile group, the gamut mapping/ appearance conversion profile group, and the output device profile group (see "Reference Manual for Postscript", 2nd edition, published by ASCII Publishing Department).

Figure 6:
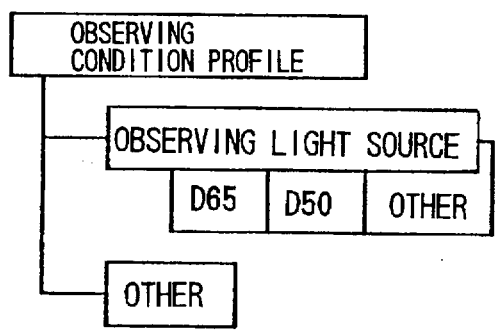
FIG. 6 is a diagram of condition profiles of the gamut mapping/appearance conversion profile group shown in FIG. 2.

If the image output unit 14A is a color printer, then observing conditions of the gamut mapping/appearance conversion profile group are arranged as shown in FIG. 6. The observing conditions include parameters relative to an observing light source, and other parameters.

Figure 7:
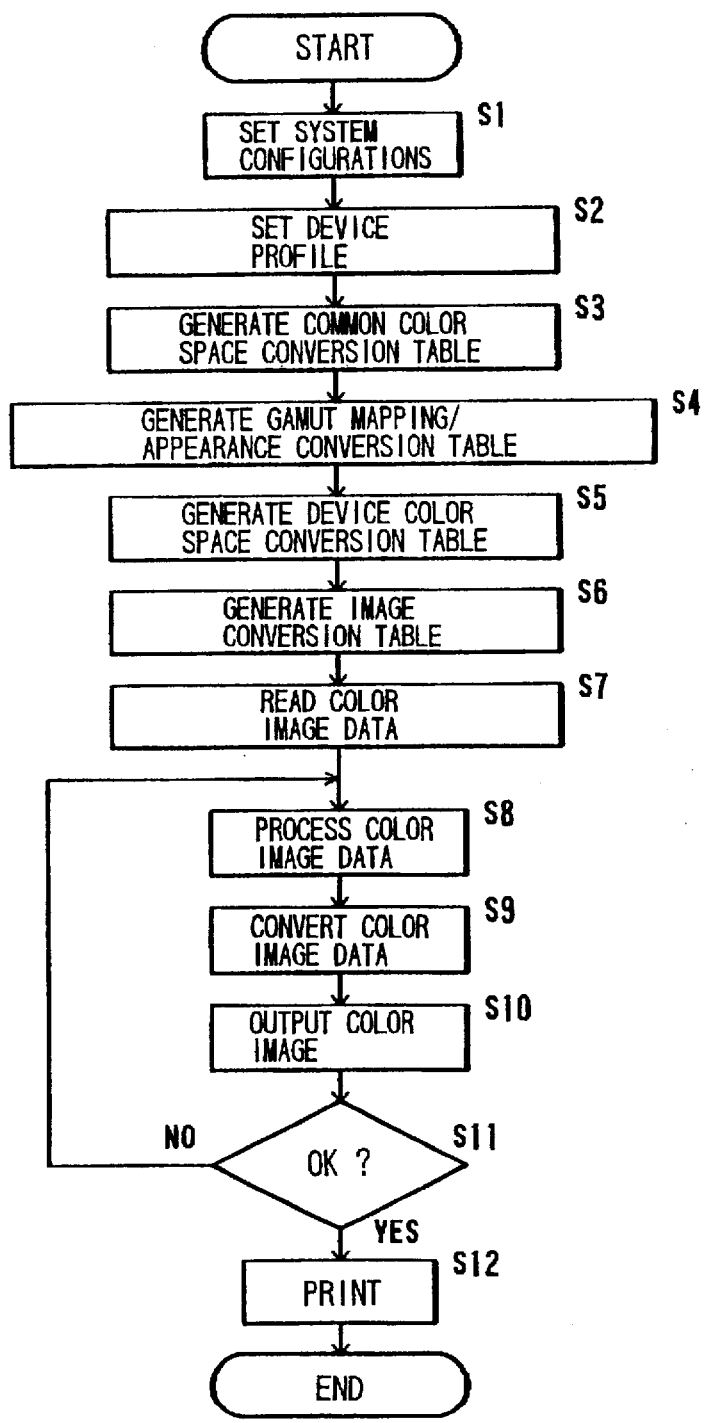
FIG. 7 is a flowchart of a processing sequence of the system for predicting a reproduced color image according to the present invention.

Data processing operation of the system for predicting a reproduced color image according to the present invention will be described below with reference to FIG. 7.

First, the operator determines system configurations including the image output unit 14B, the type of an original document on which a color image is recorded, an output medium, the type of inks used for recording a color image, and an output format, etc. in a step S1.

After the image output unit 14B and other types are determined, the device profiles shown in FIGS. 3 through 6 are established using the device profile generator 18 in a step S2. These device profiles may be determined in advance depending on given devices before the system configurations of the reproduced color image predicting system are determined.

After the system configurations and the device profiles are determined, a common color space conversion table for converting YMCK halftone dot percentage data from the image editor 12 into data in a common color space is generated in the common color space converter 20 in a step S3. At this time, the selection of basic profiles and subprofiles depends on whether the parameters relative to these profiles are prepared in the condition profiles and whether these profiles are profiles which can cope with a requested processing speed. Therefore, not all the profiles are freely selected by the operator, but some of them are limited by prepared profiles. If no desired profiles have been established, then default values are selected.

The common color space LUT generator 20 of the image processor 16 successively selects a desired color reproduction process, etc., from the printing/common color space conversion profile group shown in FIGS. 3 and 4, and generates a common color space conversion table corresponding to the image output unit 14B for producing a printed material based on the selected color reproduction process, etc. in the step S3.

To obtain a desired printed material from the image output unit 14B, a color reproduction process of the image output unit 14B is specified, and a basic formula depending on a desired accuracy and processing speed is selected.

If the image output unit 14B is of the dot modulation output type, then the Neugebauer's equation which defines the relationship between the XYZ colorimetric system and the YMCK colorimetric system in the CIE common color space is selected as a color-predicting basic function from the basic profiles shown in FIG. 3. The Neugebauer's equation according to the equation (1) has variables classified into (1) the dot gain conversion formula ($c_X$, $m_X$, $c_{Xm}$, $c_{Xmy}$, etc.), (2) the single-color stimulus values ($X_c$, $X_m$, $X_y$, $X_k$, etc.), and (3) the higher-order color stimulus values ($X_{cm}$, $X_{cmy}$, $X_{cmyk}$, etc.), and desired subprofiles are selected for each of these sets of variables.

If the single conversion formula and the perimeter conversion formula are selected from the subprofiles with respect to the dot gain conversion formula, then the $c_X$, $m_X$, $c_{Xm}$, $c_{Xmy}$, etc. are replaced by the corrective formula according to the equation (2), and the parameters $\alpha_p$, $\alpha_m$, L thereof are given by the support layer profile and the ink profile of the printing output condition profiles shown in FIG. 4. The parameter $\alpha_p$ is a variable depending on the paper on which a color image is to be printed. Typically, the parameter $\alpha_p$ is set to 13 for art paper, 16 for coat paper, and 20 for wood-free paper. The parameter $\alpha_m$ is a variable depending on the inks, and is set to 1 for average offset printing, and 1 or less when inks or printing conditions with a low dot gain are selected.

If the quadratic equation conversion formula is selected from the subprofiles with respect to the single conversion formula, then the $c_X$, $m_X$, $c_{Xm}$, $c_{Xmy}$, etc. are replaced by the corrective formulas according to the equations (3) and (4), and the gains coefficients $g_1$~$g_5$ as their parameters are given by the support layer profile, the screen ruling/dot shape profile, and the ink profile of the printing output condition profiles shown in FIG. 4.

The single conversion formula is employed for approximation when a common dot % value is used with respect to the X, Y, Z stimulus values. If different dot % values are used to correspond to the respective stimulus values X, Y, Z, then the accuracy of tristimulus values X, Y, Z that are obtained can further be increased.

As described above, the single conversion formula is employed when a common dot % value is used with respect to the X, Y, Z stimulus values. If different dot % values are used to correspond to the respective X, Y, Z stimulus values for increased accuracy, then the XYZ independent conversion formula is selected from the subprofiles with respect to the dot gain conversion formula. At this time, the $c_X$, $m_X$, etc. are replaced by the corrective formulas according to the equation (5) or (6), and the $c_{Xm}$, $c_{Xmy}$, etc. are replaced by the corrective formula according to the equation (7). The parameters $\alpha_{px}$, $\alpha_{py}$, $\alpha_{pz}$, $\alpha_m$, L, $a_{cxy}$, $b_{xxy}$, the gain coefficients $g_1$–$g_5$ are given by the support layer profile, the screen ruling/dot shape profile, and the ink profile of the printing output condition profiles shown in FIG. 4. Since different dot gain corrective quantities are taken into account with respect to the X, Y, Z stimulus values, it is possible to obtain tristimulus values X, Y, Z which correspond very well to outputted YMCK halftone dot percentage data.

If the single-color stimulus value table and the higher-order color stimulus value table are selected with respect to the single-color stimulus values and the higher-order color stimulus values, then tables relative to a given ink set and a given support layer are selected from the ink profile. If data of an ink set used in the printing output condition profile are not registered, then default values are selected from the standard profile.

As described above, the parameters of the Neugebauer's equation according to the equation (1) are determined, and tristimulus values X, Y, Z are determined from the outputted dot % values using this conversion formula.

The gamut mapping/appearance LUT generator 22 of the image processor 16 successively selects a desired color reproduction process, etc. from the gamut mapping/appearance conversion profile group shown in FIGS. 5 and 6, and equalizes the gamut mapping of the image output unit 14B in the common color space with the gamut mapping of the image output unit 14A in the common color space based on the selected color reproduction process, etc., and generates a gamut mapping/appearance conversion table for equalizing appearances corresponding to the visual adaptation in a step S4. In the generation of the gamut mapping/appearance conversion table, parameters corresponding to the observing light source are given from the observing condition profiles shown in FIG. 6 if the image output unit 14A is a color printer.

The gamut mapping/appearance conversion table is generated according to the selected process as follows: For example, the LMN conversion formula suitable for the observing conditions with respect to the printed material and the type of the color image data is selected from the basic profiles, and the nonlinear conversion table is selected from the subprofiles for conversion from the CIE-XYZ colorimetric system into the LMN colorimetric system. The non-linear conversion table is corrected with respect to the gamut mapping (the input range, the output range, etc.) and differences between observing conditions/color temperatures, and a conversion from the LMN colorimetric system into an L*M*N* colorimetric system is carried out. Finally, an inverse conversion from the L*M*N* colorimetric system into the XYZ colorimetric system is effected. A conversion table for conversion between the CIE colorimetric systems is stored as a gamut mapping/appearance conversion table in the data file 30.

Then, the device color space LUT generator 24 of the image processor 16 generates a device color space conversion table for converting color image data in the common color space into color image data in the device color space of the image output unit 14A, and stores the generated device color space conversion table in the data file 32 in a step S5. A known process using a look-up table is available for the conversion from color image data in the XYZ colorimetric system into color image data in the colorimetric system of a color printer or a CRT. For example, such a process is disclosed in "Printing CIELab imaging on CMYK printing", SPIE Vol. 1670 P316 (1992). If a plurality of output units including a color printer, a CRT, etc., are available, then it is possible to switch between a plurality of look-up tables.

The common color space LUT, the gamut mapping/appearance LUT, and the device color space LUT which have thus been generated are combined by the LUT combiner/converter 26, or stored as individual LUTs in the data file 34 in a step S6.

After the above preparatory process has been completed, the operator operates the image input unit 10 to read color image data of a color original document in a step S7. The image input unit 10 supplies the color image data as RGB data, for example, to the image editor 12, which effects desired image processing on the RGB data, and supplies the processed RGB data as YMCK halftone dot percentage data to the image processor 16 and the image output unit 14B in a step S8.

The image processor 16 converts the YMCK halftone dot percentage data supplied from the image editor 12 with the conversion table that has been established with respect to the image output unit 14A or 14B. The LUT combiner/converter 26 converts the YMCK halftone dot percentage data based on the common color space LUT, the gamut mapping/appearance LUT, and the device color space LUT, and stores the converted image data to the image output unit 14A in a step S9. Specifically, in the image processor 16, the YMCK halftone dot percentage data are converted into tristimulus values X, Y, Z in the common color space with the common color space LUT which defines the Neugebauer's equation (1) taking printing conditions into account, and thereafter the gamut mapping and appearances of the image output units 14A, 14B are adjusted with the gamut mapping/appearance LUT. Then, the tristimulus values X, Y, Z are converted into color image data corresponding to the image output unit 14A with the device color space LUT. The color image data are then outputted as a hard copy or displayed on the CRT in a step S10.

The operator confirms the outputted/displayed color image in a step S11. If the operator sees no problem with respect to colors, etc., then the operator operates the image output unit 14B to produce a printed material in a step S12. If there is a problem, then the color image data are processed again in the image editor 12, and produced YMCK halftone dot percentage data are monitored by the reproduced color image predicting system repeatedly in the step S11.

In the above embodiment, as described above, YMCK halftone dot percentage data that are corrected taking into account a dot gain in a printed material are determined from YMCK halftone dot percentage data supplied to the image output unit 14B, and the corrected YMCK halftone dot percentage data are converted into tristimulus values X, Y, Z, from which color image data to be displayed or outputted by the image output unit 14A are obtained. In taking the dot gain into account, since the dot gain differs depending on the wavelength of illuminating light used for measurement, the YMCK halftone dot percentage data are corrected independently with respect to the tristimulus values X, Y, Z. Consequently, there are obtained tristimulus values X, Y, Z which are highly close to the conditions of the printed material. As a result, the predicted image produced by the image output unit 14A and the printed image produced by the image output unit 14B match each other very well. The operator can thus evaluate and confirm a reproduced color image accurately on a hard copy, a CRT, or the like before a printed material is finally produced.

Inasmuch as conversion formulas, corrective formulas, and parameters can be added or modified as desired with respect to the basic profiles, the subprofiles, and the condition profiles, the reproduced color image predicting system according to the present invention finds a range of applications which can easily be expanded, and can reproduce color images with increased accuracy.

Although a certain preferred embodiment of the present invention has been shown and described in detail, it should be understood that various changes and modifications may be made therein without departing from the scope of the appended claims.

What is claimed is:

1. A system for predicting a color image in producing a color printed material reproduced by one of a platemaking process and a printing process from processed input color image data by outputting a version of the color image corresponding to the color printed material, comprising:

printing condition profiles which represent printing conditions of an output medium and output conditions corresponding to at least one of: the platemaking process and printing process established as parameters;

data conversion profiles which represent color space data conversion formulas established for converting the processed input color image data into data in a color space of an image monitor device, said space data conversion formulas using the parameters represented by said printing condition profiles; and converting means for converting the processed input color image data into the data in the color space of the image monitor device according to said color space data conversion formulas;

the arrangement being such that the version of the color image corresponding to the color printed material can be displayed from the data in the color space of the image monitor device.

2. A system according to claim 1, wherein said color space data conversion formulas comprise:

at least one first color space data conversion formula for converting the processed input color image data into data in a common color space using parameters represented by said printing condition profiles; and at least one second color space data conversion formula for converting the data in the common color space into data in a device color space of the image monitor device.

3. A system according to claim 2, wherein the processed input color image data comprise data corresponding to at least one area ratio of an input image, and the data in the common color space comprise tristimulus values of a CIE colorimetric system, and wherein said first color space data conversion formula comprises a Neugebauer's equation for converting the data corresponding to said area ratio into the data in the common color space.

4. The system for predicting a color image in producing a color printed material according to claim 3, wherein the Neugebauer's equation includes variables corresponding to dot gain correction values which are varied according to a perimeter conversion equation:

$$c_n = c + \alpha_p \cdot \alpha_m \cdot L \cdot \sqrt{c} \ /1500 \ (0 \leq c < 50)$$
$$= c + \alpha_p \cdot \alpha_m \cdot L \cdot \sqrt{100-c} \ /1500 \ (50 \leq c < 100)$$

where $c_n$ is the dot gain correction value;

c is an uncorrected dot gain;

$\alpha_p$ is a gain coefficient dependent upon the printed material;

$\alpha_m$ is a gain coefficient dependent upon a printing press for producing the color printed material; and L is the screen ruling.

5. The system for predicting a color image in producing a color printed material according to claim 3, wherein the Neugebauer's equation includes variables corresponding to dot gain correction values which are varied according to a quadratic equation:

$$c_n = c + g - g/250 \cdot (c-50)^2,$$

and $$g = g_1 + g_2 + g_3 + g_4 + g_5$$

where $c_n$ is the dot gain correction value;

c is an uncorrected dot gain;

$g_1$ is a gain coefficient dependent upon a printing press for producing the color printed material;

$g_2$ is a gain coefficient dependent upon an ink characteristic;

$g_3$ is a gain coefficient dependent upon a support layer of a printed material;

$g_4$ is a gain coefficient dependent upon the screen ruling; and $g_5$ is a gain coefficient dependent upon the dot shape.

6. The system for predicting a color image in producing a color printed material according to claim 3, wherein the Neugebauer's equation includes variables corresponding to dot gain correction values which are varied according to a high order dot gain equation:

$$c_{xy} = c_x - a_{cxy} \cdot y_x^2 + b_{cxy} \cdot y_x$$

where $c_{xy}$ is the dot gain correction value;

$y_x$ is a dot % value for ink Y when observed under a light having a characteristic according to a wavelength function $x(\lambda)$; and $a_{cxy}$ and $b_{cxy}$ are higher order color dot gain correction parameters.

7. A system according to claim 1, wherein said data conversion profiles comprise:

basic profiles representing at least one color space data conversion formula for converting the processed input color image data into the data in the color space; and subprofiles representing at least one of: selectable formulas and parameters corresponding to variables of said color space data conversion formula.

8. The system according to claim 7, wherein said selectable formulas are selected by a user.

9. The system for predicting a color image in producing a color printed material according to claim 1, wherein said printing condition profiles are selected based on production speed of the printing or platemaking process and comprise information corresponding to at least one of: screen ruling, dot shape, and printing pressure.

10. The system for predicting a color image in producing a color printed material as claimed in claim 1, wherein said output conditions comprise at least one of: a type of support layer for the output medium, a screen ruling, a dot shape and an ink type.

11. A method of predicting a color image by generating area modulation data for respective color materials from processed input color image data and producing a color printed material based on the area modulation data, comprising the steps of:

correcting the area modulation data based on dot gain correcting coefficients established for color space coordinates of an image with respect to an output medium and characteristics for at least one of: a platemaking process and a printing process;

producing corrected area modulation data;

generating color image data of the color space coordinates from the corrected area modulation data; and displaying a version of the color image corresponding to the color printed material based on the color image data of the color space coordinates.

12. A method according to claim 11, wherein the color space coordinates comprise tristimulus values X, Y, Z in a CIE-XYZ colorimetric system.

13. A method according to claim 11, wherein the color space coordinates comprise tristimulus values B, G, R in a BGR colorimetric system.

14. A method according to claim 11, wherein the dot gain correcting coefficient comprise additional corrective information depending on area modulation data of a color area located on a particular background.

15. The method of predicting a reproduced color image according to claim 11, wherein said correcting step is dependent upon production speed of the printing or platemaking process and said dot gain correction coefficients are established with respect to at least one of: screen ruling, dot shape, and printing pressure.

16. The method of predicting a reproduced color image according to claim 11, wherein said correcting step comprises correcting said dot gain correcting coefficients according to the equation:

$$c_n = c + \alpha_p \cdot \alpha_m \cdot L \cdot \sqrt{c} \ /1500 \ (0 \leq c < 50)$$
$$= c + \alpha_p \cdot \alpha_m \cdot L \cdot \sqrt{100 - c} \ /1500 \ (50 \leq c < 100)$$

where $c_n$ is the dot gain correction value;

c is an uncorrected dot gain;

$\alpha_p$ is a gain coefficient dependent upon the printed material;

$\alpha_m$ is a gain coefficient dependent upon a printing press for producing the color printed material; and L is the screen ruling.

17. The method of predicting a reproduced color image according to claim 11, wherein said correcting step comprises correcting said dot gain correcting coefficients according to the equation:

$$c_n = c + g - g/250 \cdot (c-50)^2,$$

and $$g = g_1 + g_2 + g_3 + g_4 + g_5$$

where $c_n$ is the dot gain correction value;

c is an uncorrected dot gain;

$g_1$ is a gain coefficient dependent upon a printing press for producing the color printed material;

$g_2$ is a gain coefficient dependent upon an ink characteristic;

$g_3$ is a gain coefficient dependent upon a support layer of a printed material;

$g_4$ is a gain coefficient dependent upon the screen ruling; and $g_5$ is a gain coefficient dependent upon the dot shape.

18. A method of predicting a reproduced color image according to claim 11, wherein said correcting step comprises correcting said dot gain correcting coefficients according to the equation:

$$c_{X_y} = c_X - a_{cX_y} \cdot y_x^2 + b_{cX_y} \cdot y_x$$

where $c_{X_y}$ is the dot gain correction value;

$y_x$ is a dot % value for ink Y when observed under a light having a characteristic according to a wavelength function $x(\lambda)$;

$a_{cX_y}$ and $b_{cX_y}$ are higher order color dot gain correction parameters.

19. The method of predicting a reproduced color image according to claim 11, wherein said output conditions comprise at least one of: a type of support layer for the output medium, a screen ruling, a dot shape and an ink type.

20. A system for predicting a color image by generating area modulation data of color materials from processed input color image data, producing a color printed material based on the area modulation data, and displaying a version of the color image corresponding to the color printed material, comprising:

printing condition profiles which represent printing conditions established as parameters, the printing conditions comprising dot gain correcting coefficients established for color space coordinates of an image with respect to an output medium and characteristics for at least one of: a platemaking process and a printing process;

corrective formula profiles which represent corrective formulas established for correcting the area modulation data based on the dot gain correcting coefficients; and conversion formula profiles which represent conversion formulas established for converting the corrected area modulation data into color image data corresponding to the color space coordinates;

the arrangement being such that color image data suitable for an image monitor device can be produced from the color image data corresponding to the color space coordinates.

21. The system for predicting a color image in producing a color printed material according to claim 20, wherein said printing condition profiles are selected based on production speed of the printing or platemaking process and comprise information corresponding to at least one of: screen ruling, dot shape, and printing pressure.

22. The system for predicting a color image in producing a color printed material according to claim 20, wherein said dot gain correcting coefficients are determined according to the equation:

$$c_n = c + \alpha_p \cdot \alpha_m \cdot L \cdot \sqrt{c} \ /1500 \ (0 \leq c < 50)$$
$$= c + \alpha_p \cdot \alpha_m \cdot L \cdot \sqrt{100 - c} \ /1500 \ (50 \leq c < 100)$$

where $c_n$ is the dot gain correction value;

c is an uncorrected dot gain;

$\alpha_p$ is a gain coefficient dependent upon the printed material;

$\alpha_m$ is a gain coefficient dependent upon the printing press for producing the color printed material; and L is the screen ruling.

23. The system for predicting a color image in producing a color printed material according to claim 20, wherein said dot gain correcting coefficients are determined according to the equation:

$$c_n = c + g - g/250 \cdot (c-50)^2,$$

and $$g = g_1 + g_2 + g_3 + g_4 + g_5$$

where $c_n$ is the dot gain correction value;

c is an uncorrected dot gain;

$g_1$ is a gain coefficient dependent upon a printing press for producing the color printed material;

$g_2$ is a gain coefficient dependent upon an ink characteristic;

$g_3$ is a gain coefficient depending a support layer of a printed material;

$g_4$ is a gain coefficient dependent upon the screen ruling; and $g_5$ is a gain coefficient dependent upon the dot shape.

24. The system for predicting a color image in producing a color printed material according to claim 20, wherein said dot gain correcting coefficients are determined according to the equation:

$$c_{xy} = c_x - a_{cxy} y_x^2 + b_{cxy} y_x$$

where $c_{xy}$ is the dot gain correction value;

$y_x$ is a dot % value for ink Y when observed under a light having a characteristic according to a wavelength function $x(\lambda)$; and $a_{cxy}$ and $b_{cxy}$ are higher order color dot gain correction parameters.

25. The system for predicting a color image in producing a color printed material according to claim 20, wherein said output conditions comprise at least one of: a type of support layer for the output medium, a screen ruling, a dot shape and an ink type.

* * * * *